US009128755B2

(12) United States Patent
Madaiah

(10) Patent No.: US 9,128,755 B2
(45) Date of Patent: Sep. 8, 2015

(54) METHOD AND APPARATUS FOR SCHEDULING RESOURCES IN SYSTEM ARCHITECTURE

(71) Applicant: TEJAS NETWORKS LIMITED, Banaglore, Karnataka (IN)

(72) Inventor: Vinod Kumar Madaiah, Karnataka (IN)

(73) Assignee: Tejas Networks Limited (IN)

( * ) Notice: Subject to any disclaimer, the term of this patent is extended or adjusted under 35 U.S.C. 154(b) by 275 days.

(21) Appl. No.: 13/622,673

(22) Filed: Sep. 19, 2012

(65) Prior Publication Data

US 2013/0074089 A1 Mar. 21, 2013

(30) Foreign Application Priority Data

Sep. 19, 2011 (IN) .............................. 3229/CHE/2011

(51) Int. Cl.
*G06F 9/46* (2006.01)
*G06F 9/48* (2006.01)
(52) U.S. Cl.
CPC .................................... *G06F 9/4881* (2013.01)
(58) Field of Classification Search
CPC ..................................................... G06F 9/4881

USPC .......................................................... 718/103
See application file for complete search history.

(56) References Cited

U.S. PATENT DOCUMENTS

| 7,565,651 | B1 * | 7/2009 | Carey ............................. 718/100 |
| 7,826,607 | B1 * | 11/2010 | de Carvalho Resende et al. ............................. 379/225 |
| 2003/0172104 | A1 * | 9/2003 | Hooman et al. ............... 709/103 |
| 2005/0157735 | A1 * | 7/2005 | Kan et al. ....................... 370/412 |
| 2007/0140285 | A1 * | 6/2007 | Goetzinger et al. ........... 370/412 |
| 2011/0161976 | A1 * | 6/2011 | Alexander et al. ............ 718/104 |

* cited by examiner

*Primary Examiner* — Emerson Puente
*Assistant Examiner* — Charlie Sun
(74) *Attorney, Agent, or Firm* — Merchant & Gould P.C.

(57) ABSTRACT

The present invention relates to a method and apparatus for scheduling resources in system architecture. In one embodiment, this can be accomplished by storing temporarily jobs form a plurality of queues, where each queue a weight is set up, forming a set of elements, wherein the set size is based on the weights assigned to each queue, selecting one element from the formed set in an order, wherein the order can be predefined or random order and serving at least one job from the plurality of queues, wherein selection of the job is from the queue that corresponds to element of the formed set.

12 Claims, 3 Drawing Sheets

METHOD AND APPARATUS FOR SCHEDULING RESOURCES IN SYSTEM ARCHITECTURE

This application claims benefit of Serial No. 3229/CHE/2011, filed 19 Sep. 2011 in India and which application is incorporated herein by reference. To the extent appropriate, a claim of priority is made to the above disclosed application.

FIELD OF THE INVENTION

The present invention relates generally to scheduling, and more particularly to a method and apparatus of scheduling resources to perform tasks in system architecture.

BACKGROUND OF THE INVENTION

In operations, scheduling of tasks can greatly affect system performance. For example, if multiple tasks are pending and such tasks have varying priorities, then scheduling is intended to attend to each of the multiple tasks while also addressing the priorities of the tasks.

In recent years, queuing schedulers have been widely used in networks or in any other environment to meet performance requirements (e.g. latency, delay, jitter, fairness, etc.) of real-time applications, such as voice and video transmissions etc.

Scheduling may be implemented in many different ways. In one example, a round robin scheduling schedules or serves or processes the tasks such that tasks are ordered according to their priorities and then sent to a device driver one at a time based on such priorities. Similarly, groups or sets of tasks are served based on weights assigned to each prioritized queues in weighted round robin scheduling.

However, conventional scheduling algorithms may schedule certain tasks ahead of higher priority tasks because of the structure of the operation. In conventional round robin scheduling, weighted round robin scheduling, or similar processes packets may continue to be scheduled from a queue after there are no more packets remaining in the higher priority queue.

The simplest scheduler is a round robin scheduler. A round robin scheduler maintains one queue for each class, and serves each queue in round-robin fashion, taking one packet (of any size) from each non-empty queue in turn. In a round robin scheduler, a source sending long packets generally gets more bandwidth than a source sending short packets. In other words, the round-robin scheme is fair in terms of number of packets per queue, but might not be fair in terms of bandwidth per queue. Furthermore, a round-robin scheduler does not have a means to give more bandwidth to one queue over another queue.

Other schedulers include weighted fair queuing (WFQ), deficit round robin (DRR), and weighted round robin (WRR) which are the most widely used methods for IP-based data network schedulers. Schedulers are used in many types of networking equipment, such as: modems, Wi-Fi access points (APs), base stations, packet data serving nodes (PDSNs), routers/switches, etc.

DRR and WRR schedulers serve each queue in round-robin fashion, but a fixed amount of credit is given to each queue. Each queue is allowed to send up to the given credit in each turn. Therefore, fairness in terms of bandwidth among the queues may be obtained.

The credit-based approach is also able to give preference to one queue over the other queues, by assigning different amounts of credit to different queues.

Thus, in credit-based schedulers such as DRR and WRR, a credit or weight is given to each queue in order to achieve a desired bandwidth allocation among the queues. The size of the credit or weight can have a significant impact on the performance of the scheduler.

Until now, all the above mentioned schedulers or method for scheduling stick to a particular order of selecting queues. However, no effective solution exists to improve the selection of queue dynamically, so that the performance of the scheduler is improved which leads to an effective utilization of bandwidth.

SUMMARY OF THE INVENTION

An aspect of the present invention is to address at least the above-mentioned problems and/or disadvantages and to provide at least the advantages described below.

Accordingly, an aspect of the present invention is to provide a method of scheduling resources in system architecture, the method comprising a plurality of queues for temporarily storing jobs to each of which a weight is set up, forming a set of elements, wherein the set size is based on the weights assigned to each queue, selecting one element from the formed set in an order, wherein the order can be predefined or random order and serving at least one job from the plurality of queues, wherein selection of the job is from the queue that corresponds to element of the formed set.

In accordance with another aspect, the present invention provides an apparatus for scheduling resources in system architecture, the apparatus comprising a plurality of queues for temporarily storing entered jobs, to each of which a weight is set up and a scheduler or a processor having a random number generator and a memory, wherein the scheduler or processor is coupled to the plurality of queues, wherein the scheduler or processor configured for, forming a set of elements, wherein the set size is based on the weights assigned to each queue, selecting one element from the formed set in an order, wherein the order can be predefined or random order, serving at least one job from the plurality of queues, wherein selection of the job is from the queue that corresponds to element of the formed set and preventing the use of the element from the formed set once the selection is made to that element, to form a new set.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Persons skilled in the art will appreciate that elements in the figures are illustrated for simplicity and clarity and may have not been drawn to scale. For example, the dimensions of some of the elements in the figure may be exaggerated relative

DETAIL DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
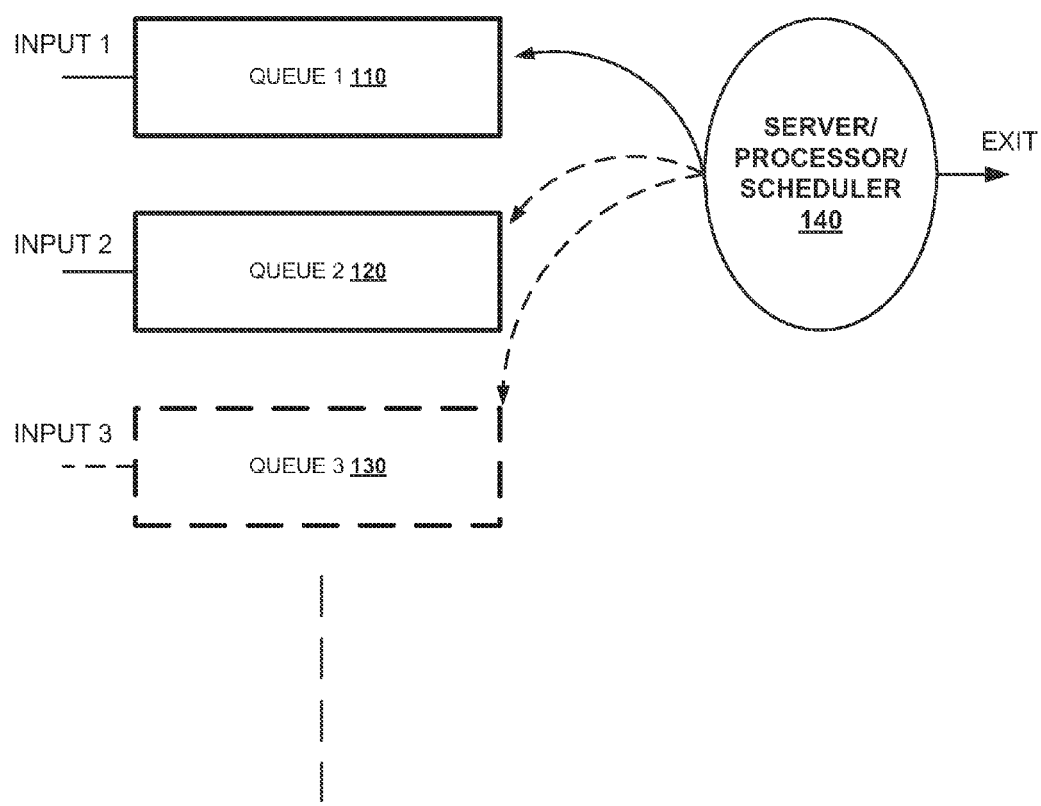
FIG. 1 shows a prior art example block diagram where server selects one or more queue in a particular order.
Figure 2:
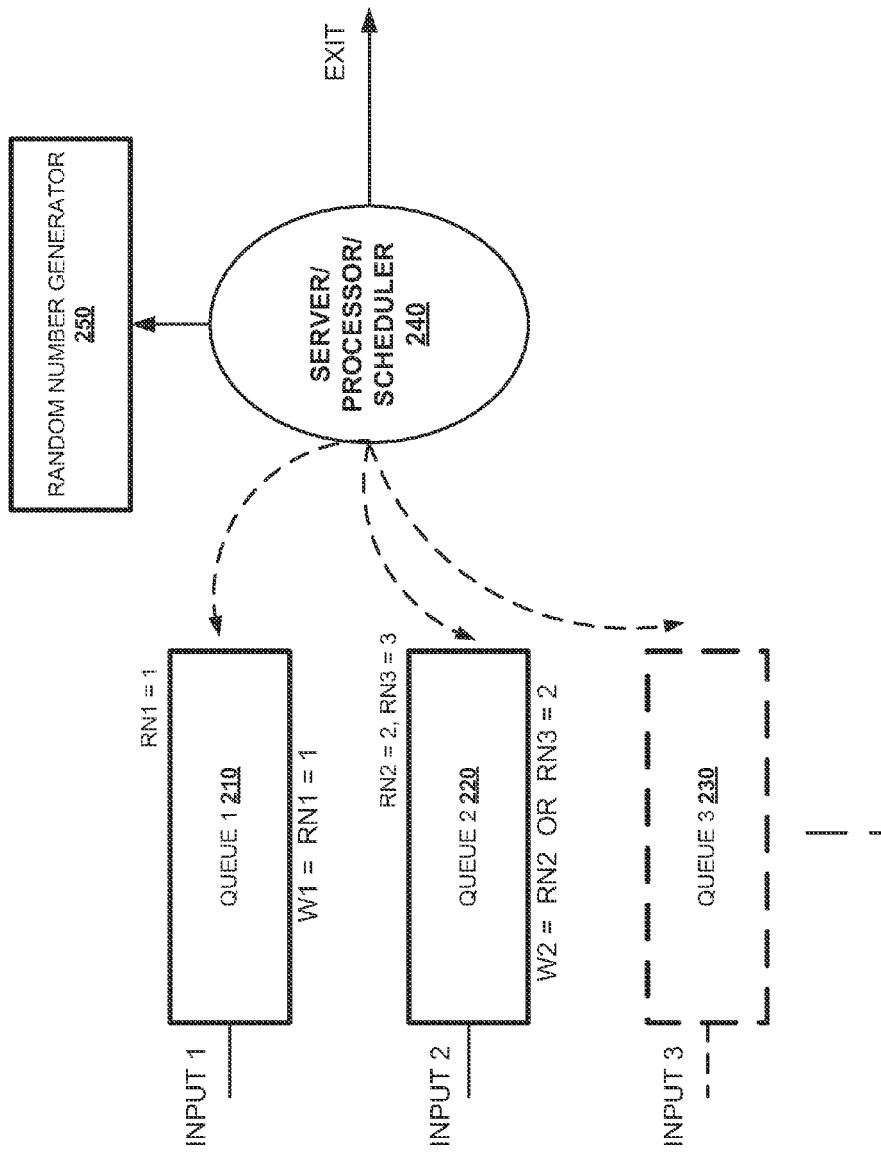
FIG. 2 shows block diagram where server selects one or more queue in a random order according to one embodiment of the present invention.
Figure 3:
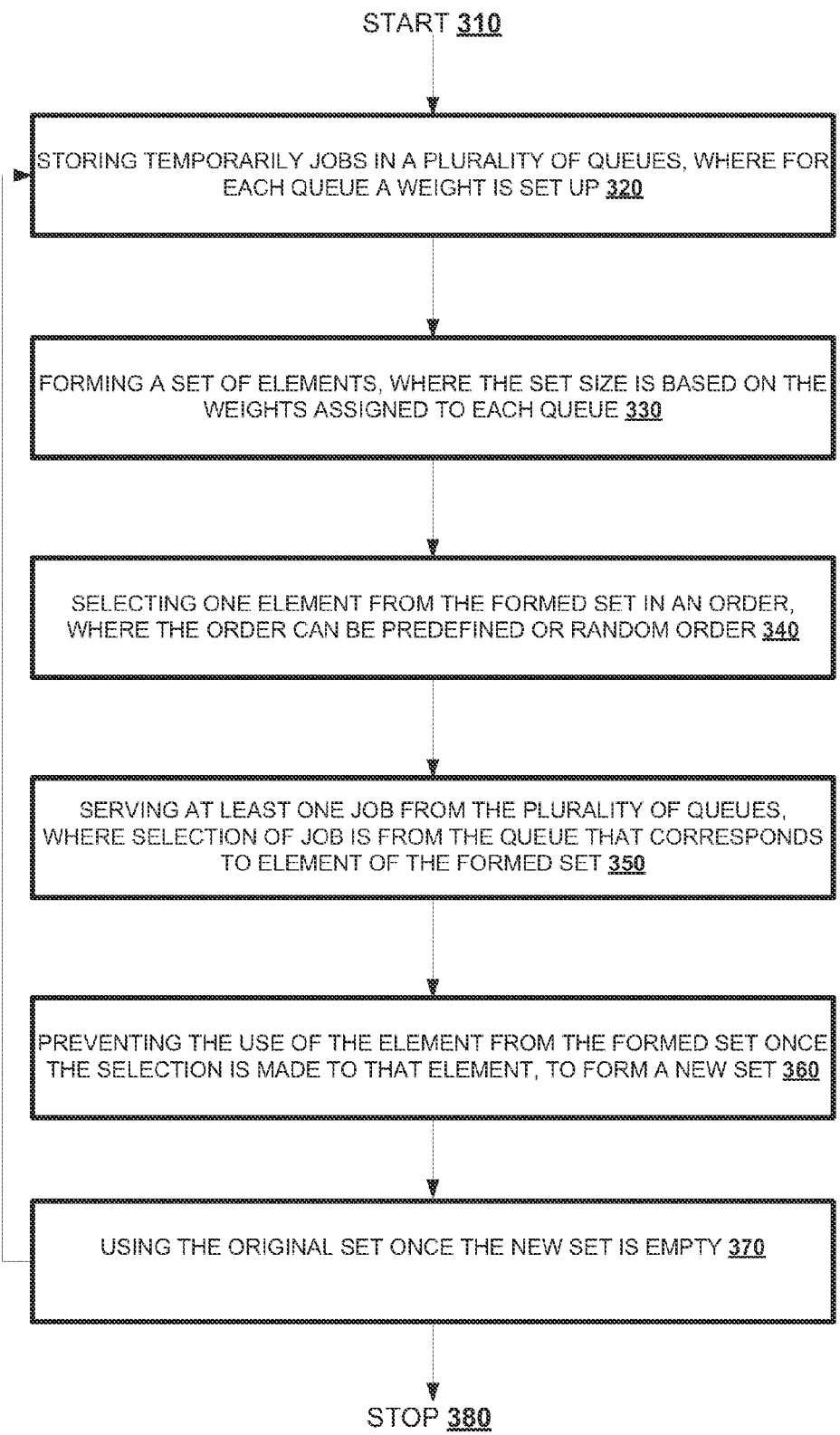
FIG. 3 shows a flow chart of a method of scheduling resources in system architecture according to one embodiment of the present invention.

FIGS. 1 through 3, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 illustrates an exemplary block diagram of a typical scheduling mechanism where server selects one or more queue in a particular order. As illustrated, one or more queues, each of which is configured to be scheduled by the server, transmit jobs received from a respective one of a plurality of job sources (i.e. input 1, input 2 . . . etc). The server 140 is configured to cause each particular queue in the plurality of queues 110, 120, 130 etc to transmit in order the next highest priority job. The next highest priority job is transmitted mainly based on the i) timing requirements of the job, and ii) a determination that transmission of the job will not delay a transmission of a higher priority job in another queue, etc.

FIG. 2 illustrates an exemplary embodiment of the scheduling mechanism in a system architecture, where server 240 selects one or more queue in a random order (using e.g. Random Number Generator 250) according to one embodiment of the present invention. As illustrated, one or more queues, each of which is configured to be scheduled by the server, transmit jobs received from a respective one of a plurality of job sources (i.e. input 1, input 2 . . . etc). The job sources 210, 220, 230 etc may include, for example: one or more pattern generators, a user interface through which a user may define jobs, computing units in a data center, processing resources in a processor, memory units in a memory, TCP segments, Ethernet packets, software threads, physical layer resource blocks in LTE or various combinations of hardware, software and/or users for supplying jobs or data packets and like.

In an example environment considering network system where data packets are in one or more queues which are to be scheduled by the server in a communication network. The server of the system is coupled with a random number generator, where the server schedules the data packets in one or more queues randomly. The server may include one or more programmable logic and/or logic gates. The random number generator may be a pseudo random generator or any of the random number generators available in the art. In an operation, when the server is ready to schedule the data packets, the server coupled to the random number generator and request for a random number. In return, the random number generator generates a plurality of numbers forming a set of number. The server picks up a number from the set of number generated by the generator. Once the server picks the random number, the picked or selected random number is deleted from the set of random numbers generated by the random number generator. By repeating the process, the set ends up being empty after multiple deletions. Once the set is empty, original set is used again.

Example: Say $\{0, 1\}$ is the original set. The random number generator will randomly pick a number and give to server on request. In this example let say, the random number generator picks '0'. Then the new set becomes $\{1\}$. Now the random number generator will pick the only available number from the new set which is '1'. After picking this number the set becomes empty $\{\ \}$. So the random number generator will start with original set $\{0, 1\}$ and the process goes on. Other examples of set could be $\{0, 1, 2, 3, 4, 5\}$, $\{0, 3, 4, 5, 10\}$, $\{1, A, 3, <, 5\}$, $\{0, 1, 3, 4, 3, 4, 763\}$, $\{0, 1, 2, 2, 3, 1, 4, 5, 2\}$ etc. It is always possible that elements of the set could occur multiple times, that is, can be repeated.

When the server is ready to serve a job, it will request for a random number (RN) from the random number generator (RNG). It is always possible that server requests the RN or RNG provides the RN or it is provided by some other means. Each queue is assigned at least one RN either automatically or by the operator. In the figure i.e. FIG. 2 operator wanted to assign weights W1=1 W2=2. That is, operator wanted two jobs to be served from queue 2. Group of RN is assigned to each queue based on the weights. If weight is one then only one RN is assigned to that queue. If weight is two then two RNs are assigned to that queue. In the figure, the set on which the RNG operates is $\{1, 2, 3\}$. Further, queue 1 is assigned RN1 whose value is '1' and queue 2 is assigned RN2 and RN3 whose values are '2' and '3'. Notice W2 is computed as logical OR of RN2 and RN3, that is, 'RN2 OR RN3'. It means if one of RN2 or RN3 is provided to the server then queue 2 will be served. As the RNG has three elements in its set, 3 packets will be served in each session: one from queue1 and two from queue 2 (Note: Calling session instead of round, because practically there is no round. It is all random order.) Notice that if the set was {1, 2, 2} then also weights will be satisfied even if element matching the criteria RN3=3 does not exists in the set. This is because RN2=2 occurs twice in a particular session.

The RNG uses initial set that is non-empty. RNG generates RN i.e. randomly picks an RN from the initial set. Server uses the value of RN to locate the queue corresponding to that RN and serves one unit of job from the said queue. RNG deletes the said RN from the initial set to arrive at new set. RNG randomly picks an RN from the new set. Server uses the value of this new RN to locate the queue corresponding to that new RN and serves one unit of job from the said queue. This serving continues until the set is empty. When set is empty RNG uses initial set. And so on. By enabling random selection of queues the present invention improves the scheduling mechanism, where bursty traffic may be converted into nonbursty traffic. Further, grouped selection of jobs may be converted into sparse selection of jobs. Same queue may not be served immediately even if weight of a queue is more than 1. Sometimes a queue may be served immediately (example: if the new set is {2, 3} then for the (FIG. 2) queue 2 will be served one after the other. But if the new set is {1, 3} then for the (FIG. 2) queue 2 will be served after serving queue 1. Whereas in the prior art scheduling mechanism (like WRR and DRR) same queue will be served again if weight of a queue is more than 1.

Alternatively, instead of selecting the elements randomly, elements may also be selected in a pre-defined order. In an example embodiment, if the set is {1, 4, 5, 1, 2, 3} and selection of the element is to be performed in a pre-defined order then job from a queue corresponding to the first element i.e. corresponding to 1 is served. Then job from a queue corresponding to the second element i.e. corresponding to 4 is served. Then job from a queue corresponding to the third element i.e. corresponding to element 5 is served. Then job from a queue corresponding to the fourth element i.e. corresponding to element 1 is served. Notice that before the set becomes empty, job from the queue corresponding to the element 1 is served twice. Then job from a queue corresponding to the fifth element i.e. corresponding to element 2 is served. Then job from a queue corresponding to the sixth element i.e. corresponding to element 3 is served. Though the set is pre-defined the server will appear to be serving the jobs in a random order per every session. Randomness is the result of how randomly the elements of the set are populated or provisioned.

The system architecture includes at least one node, where the node may be or may include a router, switch, scheduler, Operating system, date communication system etc.

FIG. 3 shows a flow chart of a method of scheduling resources in system architecture which starts at 310 according to one embodiment of the present invention. At method 320, jobs are stored temporarily in one or more queues, where each queue is set up with a weight. The method at 330 forms a set of elements, wherein the set size is based on the weights assigned to each queue. At 340, the method selects one element from the formed set in an order, wherein the order can be predefined or random order. The method selects randomly or in predefined order the next available element from the newly formed set. At 350, the method serves one or more job from the plurality of queues, wherein selection of the job is from the queue that corresponds to element of the formed set. At step 360, the method prevents the use of the element from the formed set once the selection is made to that element, to form a new set. The method also recreates the set with all the elements once the new set is empty using the original set at step 370, and stops at step 380.

FIGS. 1-3 are merely representational and are not drawn to scale. Certain portions thereof may be exaggerated, while others may be minimized. FIGS. 1-3 illustrate various embodiments of the invention that can be understood and appropriately carried out by those of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

I claim:

1. A method of scheduling resources in system architecture, the method comprising:
    receiving a plurality of queues, each of the plurality of queues temporarily storing jobs to be scheduled for processing, each of the plurality of queues being associated with a weight;
    requesting a plurality of random numbers from a random number generator, wherein requesting the plurality of random numbers comprises requesting a random number corresponding to each of the plurality of queues;
    forming a set of elements from the requested plurality of random numbers, each element in the set of elements being associated with one of the plurality of queues, wherein a total number of elements in the set of elements is based on the weight assigned to each of the plurality of queues, and wherein an element in a number of elements in the set of elements associated with a queue in the plurality of queues is based on the weight associated with the queue;
    selecting a first element from the formed set of elements in an order, wherein the order is a predefined order or a random order;
    locating a first queue from the plurality of queue associated with the selected first element;
    scheduling at least one job from a first queue corresponding to the selected first element for processing; and
    removing the first selected one element from the set of elements.

2. The method of claim 1, further comprising:
    selecting, randomly or in predefined order, a second element from remaining elements of the set of elements.

3. The method of claim 1, further including:
determining whether there are no remaining elements in the set of elements; and
creating, in response to determining that there are no remaining elements, another set of elements, wherein creating another set comprises creating the another set re-using elements of original set of elements with all the elements once the set of elements is empty.

4. The method of claim 1, further comprising:
determining whether the set of elements is empty;
creating, in response to determining that the set of elements is empty, a new set of elements, wherein creating the new set of elements comprises:
requesting a new set of random numbers from the random number generator; and
forming the new set of elements based on the requested new set of random numbers.

5. The method of claim 1, wherein forming the set of elements comprises:
associating at least one random number with the each of the plurality of queues.

6. The method of claim 5, wherein associating at least one random number with each of the plurality of queues comprises associating a higher number of random numbers with a queue in the plurality of queue having a higher weight associated with.

7. The method of claim 1, wherein forming the set of elements from the plurality of numbers comprises:
associating a first random number with the first queue from the plurality of queues, the first queue associated with a first weight;
associating a second random number with a second queue from the plurality of queues, the second queue associated with a second weight, the second weight being twice in value of the first weight; and
forming the set of elements comprising the first random number and the second random number, wherein the second random number is represented twice a number of the first random number in the set of elements.

8. An apparatus for scheduling resources in system architecture, the apparatus comprising:
a memory configured to store a plurality of queues, each of the plurality of queues comprising a plurality of jobs to be scheduled for processing, each of the plurality of queues being associated with a weight;
a random number generator; and
a processor connected to the memory and the random number generator, wherein the processor comprises a scheduler configured:
request a set of random numbers from the random number generator,
form a set of elements from the set of random numbers requested from the random number generator, wherein each element in the set of elements is associated with one of the plurality of queues, wherein a number of elements in the set of elements associated with a queue in the plurality of queues is based on the weight associated with the queue, and wherein an element in a total number of elements in the set of elements is based on the weight assigned to each of the plurality of queues;
select a first element from the formed set of elements in an order, wherein the order a predefined order or a random order;
determine a first queue from the plurality of queues associated with the selected first element;
schedule at least one job from the determined first queue of the plurality of queues; and
prevent the use of the first element from the formed set of elements once the selection is made to first element, wherein preventing the use of the first element comprises removing the first element from the set of elements to form a new set of elements.

9. The apparatus of claim 8, wherein the scheduler is further configured to select a second element from the new set of elements.

10. The apparatus of claim 8, wherein the random number generator is a pseudo-random number generator.

11. The apparatus of claim 8, wherein the apparatus comprises at least one node.

12. The apparatus of claim 11, wherein the node includes at least one of the following: a router, a switch, a scheduler, an Operating system, and a data communication system.

* * * * *